Sept. 27, 1932.  W. H. NOELTING ET AL  1,879,429
ADJUSTABLE ADAPTER FOR CASTERS
Filed March 13, 1931
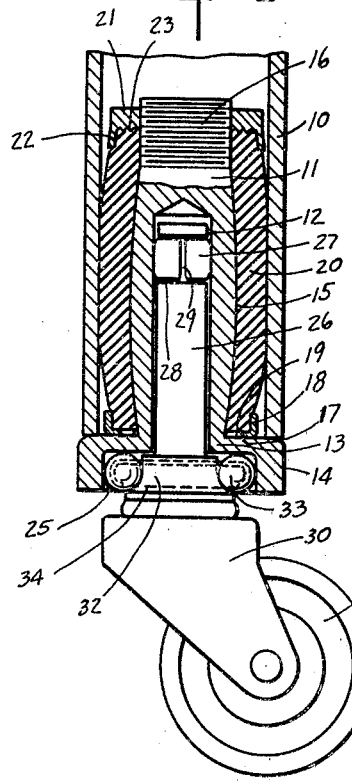
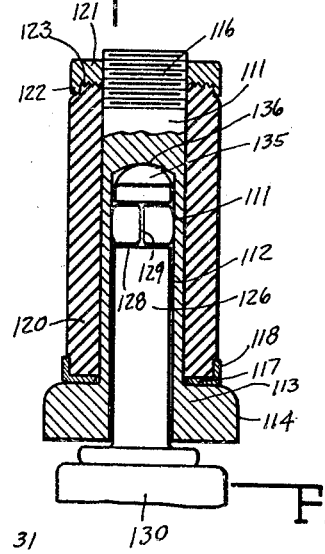
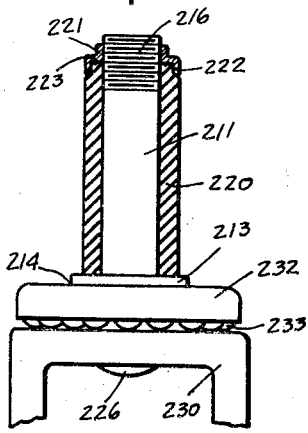
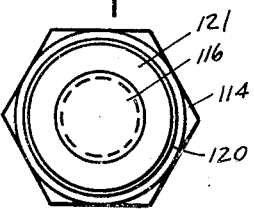
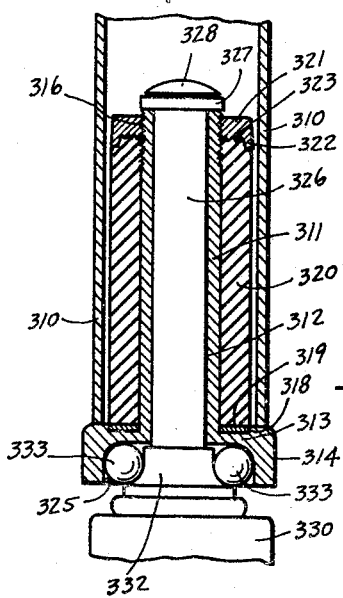
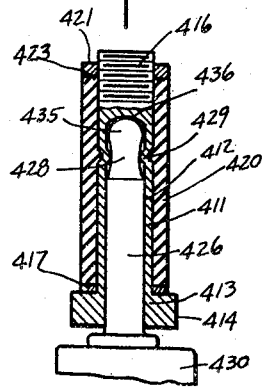
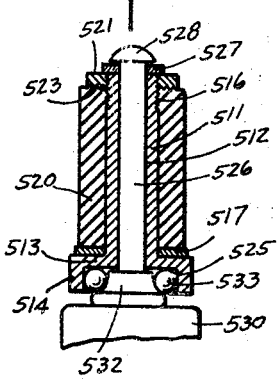
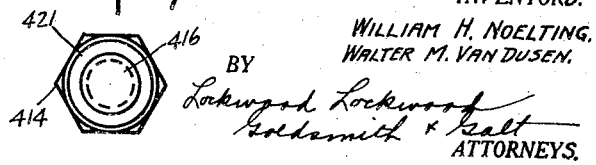
INVENTORS.
WILLIAM H. NOELTING.
WALTER M. VAN DUSEN.
BY Lockwood Lockwood
Goldsmith & Salt
ATTORNEYS.

Patented Sept. 27, 1932

1,879,429

UNITED STATES PATENT OFFICE

WILLIAM H. NOELTING AND WALTER M. VAN DUSEN, OF EVANSVILLE, INDIANA, ASSIGNORS TO FAULTLESS CASTER COMPANY, OF EVANSVILLE, INDIANA, A CORPORATION

ADJUSTABLE ADAPTER FOR CASTERS

Application filed March 13, 1931. Serial No. 522,216.

This invention relates to an expansible and adjustable socket and caster construction.

This invention is an improvement on that shown in the co-pending application Serial No. 362,498, filed May 13, 1929, entitled "Adjustable adapter frame for caster".

The chief object of the present invention is to provide an adjustable adapter caster supporting socket, or the like, with means which may be readily expanded for adjusting the same to fit the interior of a relatively small diameter tube or leg and which will be materially cheaper to construct than the form of the invention shown in the co-pending application referred to.

The chief feature of the invention consists in a peripheral enclosing sleeve of tubing, or the like, which is laterally expanded by causing the two ends thereof to relatively approach each other.

The full nature of the invention will be understood from the accompanying drawing and the following description and claim:—

In the drawing, Fig. 1 is a central sectional view of a tube, or leg, with a caster socket associated therewith and detachably supporting a caster, the latter being shown in elevation.

Fig. 2 is a similar view of a modified form of construction, part of the socket being shown in elevation and a part of the caster detachably associated therewith also being shown in elevation.

Fig. 3 is a top plan view thereof.

Fig. 4 is an elevational view of a combined socket and caster, the laterally expansible means and the means for expanding the same being shown in central section.

Fig. 5 is a view similar to Fig. 1 but of a so-called permanently connected caster and socket.

Fig. 6 is a central sectional view through a modified form of socket and a modified form of caster stem.

Fig. 7 is a top plan view thereof.

Fig. 8 is a view similar to Fig. 6 but of a permanent combination socket and caster.

In Fig. 1 of the drawing, 10 indicates a tubular leg, 11 indicates an elongated body portion having a tubular bore 12 therein, said body adjacent the mouth of the bore being laterally enlarged or flanged as at 13 and which preferably has a hexagonal outline 14 for wrench or like tool engagement. The flange 13 supports the lower end of the leg 10.

As shown in Fig. 1, the body portion intermediate its ends may be enlarged laterally as at 15 for a purpose hereinafter set forth. The upper end of the body is threaded as at 16. Rotatably mounted upon the body is a washer 17 with an upturned flange 18 which is associated with the lower end 19 of a tubular member 20, which may be of sleeve character and laterally and outwardly expansible by end compression.

Rubber tubing formed by a tubing machine or rubber tubing reinforced by layers of canvas or steel mesh, may be employed for this purpose, or if a more expensive construction is desired, a moulded rubber sleeve may be employed.

Threadedly mounted on the threaded portion 16 of the body is a nut 21, which is smaller than the opening in the tubular leg. This nut may have a suitable outline for wrench engagement. It may also have, as shown in Fig. 1, a depending skirt 22 and may also include a serrated or knurled face 23. The purpose of the skirt is to confine the upper end of the tubular member 20 against outward expansion immediately adjacent its contact with the nut, so that the expansion takes place throughout the intermediate portions of the tube 20. The serrated face 23, when the nut is positioned adjacent the upper end of the rubber tubing, engages the same and thus the two are prevented against relative rotational movement. The skirt if of proper size may frictionally grip the end of the sleeve and serve the same purpose as the serrations which may be omitted. Although not shown the inner wall of the skirt may be roughened, serrated or knurled.

To position the socket in the leg, the nut 21 may be rotated until it bears upon or engages the upper end of the rubber tubing, whereupon the rubber tubing will rotate with it and relative to the metal body 11. This movement of the nut 21 toward the flange 13, causes lateral and outward expansion of the rubber tube until it is of sufficient exterior diameter that it will frictionally engage the inner wall of the tubular leg when the socket is inserted in the leg. After insertion of the socket in the leg until the flange 13 bears against the lower end of said leg, a wrench or the like, applied to the surface 14 of flange 13 will, by reason of the friction grip between the rubber tubing 20 and the interior of the leg 10, which holds the nut 21 relatively stationary, cause rotational movement of the body 11 and cause additional expansion of the rubber tube for firmly anchoring the socket in the leg.

To remove the socket from the leg, all that is required is to reversely rotate the flange 13 until such time as the friction grip between the rubber tubing and the interior of the leg is lost and the tubing and nut rotate with the flange 13. The entire socket then may be readily withdrawn from the leg.

As shown clearly in Fig. 1, the bore 12 in the flange 13 is laterally enlarged as at 25 adjacent the mouth of the bore 12. Mounted in the bore 12 is a caster stem 26 which mounts a friction retaining ring 27 in the groove 28. Said ring is split as at 29 and is constrained toward outward movement or expansion. Said ring frictionally retains the stem, and, therefore, the caster in the socket bore. The lower end of the stem supports the usual yoke 30 which, in turn, supports the usual caster wheel 31. The stem immediately above the yoke is herein illustrated as provided with a bearing surface 32, adapted for engagement by the balls 33 of a detachable race construction, said balls being retained in race formation by the usual caging 34. The balls also engage the walls of the enlarged recess 25 and thus an anti-friction, load sustaining connection is obtained between the caster and the socket.

In Fig. 2 there is illustrated a modified form of the invention, wherein the socket detachably supports a caster but not of the anti-friction type. Similar numerals of the one-hundred series indicate similar parts. In this form of the invention, the load is transmitted through a top bearing arrangement, to wit, the head 135 of the caster stem 126 bearing upon the head 136 of the tubular bore 112.

In this form of the invention also, the body 111 is not laterally enlarged and the threaded portion 116 is of substantially the same diameter as the body portion, whereas, in Fig. 1 the threaded portion is of a reduced diameter.

In Fig. 4, there is illustrated a simplified form of the invention. In this form of the invention, 230 indicates the yoke, 226 the enlarged portion of the stem retaining the same and the anti-friction elements 233 ride upon the yoke and transmit the load from the cup type retainer 232, which bears upon the flange 213 having the tool engageable periphery 214. Flange 213 is carried by the body 211. The lower end of the tubular leg bears upon the plate member 213 and the same is rotatably mounted upon the stem 226. The laterally expansible tubular means such as the rubber tubing 220 bears at its lower end upon the plate 213 and, as illustrated, the intermediate washer is omitted. The upper end of the rubber like tubular means 220, is engaged by the serrated face 223 of the nut 221 having the tube confining skirt 222. This nut is shown as a metal stamping.

For large size tubings there may be provided an intermediate washer to separate the collar 213 from retainer 232, and the outer periphery of this washer may be slotted or shaped in such a way as to be adaptable to a tool forcing it to rotate. The retainer could be turned by pliers, wrench, or other such tools which would serve this purpose.

In Fig. 5 there is illustrated a so-called permanent combination type construction. In this form of the invention, 310 indicates the tubular leg, 311 the body portion having a bore 312 extending entirely therethrough. The body portion 311, in this form of the invention, has a substantially uniform diameter throughout the major portion of its length and is not laterally enlarged intermediate its ends as illustrated in Fig. 1. The stem 326 extends through the bore 312 and projects beyond the same at each end. The lower end of the stem is provided with the ball raceway 332 which engages the balls 333 that are mounted within the enlarged recess 325 of the bore 312 in the lower face of the lateral flange 313. The periphery 314 of the flange is arranged for tool engagement. The stem supports the yoke 330. The upper end of the stem supports a washer or retainer 327 and the stem is enlarged as at 328 to overlie the washer and thus separation of the stem and the body of the socket is prevented. The result, therefore, is a permanent combination of caster and socket.

In the present form of the invention, the flange 313 is recessed as at 318 and seatable therein, if desired, is a washer 319. This washer, however, may be omitted and in that event, the lower end of the rubber tubing 320 may nest in the annular groove or recess 318. The body portion 311 is shown substantially of uniform diameter adjacent the mounting for the rubber tubing 320 and the upper end of said body is threaded as at 316 to receive the nut 321 which has the depending skirt 322 for tubing retention at the upper end thereof and the serrated face 323 for frictionally gripping the upper end of the tubing. As before mentioned, the nut 321 and the plate flange 313 are rotated relative to each other, until the tubing 320 is expanded from the position shown in Fig. 5 to the position shown in Fig. 1; in other words, until it is of sufficient expanded diameter to frictionally engage the interior of the tubular leg 310. After this has taken place, following the insertion of the initially adjusted arrangement, the portion 314 is rotated which causes relative threading movement between the body 311 and the nut 321, since the nut is held against rotation through the instrumentality of the engagement of the face 323 of said nut with the rubber tubing and the latter's frictional engagement with the interior of the leg. Portion 313 is rotated until the desired frictional grip is obtained for holding the socket and caster in the leg. The stem is of the free swiveling type and the entire structure is what is termed a permanent caster combination.

In Fig. 6 there is illustrated a simplified form of the invention, in which the body 411 includes the bore 412 that terminates in the top bearing portion 436 engageable by the head 435 of a caster stem 426, the stem having the reduced neck portion 428 which is associated with the indentations 429, the same constituting the retaining portions for the stem. The body 411 terminates in a lateral flange 413 at one end, having the tool engageable periphery 414 and at its other end, terminates in the threaded portion 416. The threaded portion 416 receives nut 421, having serrated face 423 for engaging the upper end of the rubber tubing 420 which surrounds the body. The lower end of the tubing may either bear upon the flange 413 or may bear upon the washer 417. The tubular leg bears upon the exposed portion of the upper face of the flange 413.

In Fig. 8 a simplified form of the invention shown in Fig. 5 is illustrated. In this form of the invention, the caster and socket are shown as a permanent combination and are shown as of the anti-friction type. 530 indicates the yoke, 526 the stem which terminates in a laterally enlarged portion 528 that is associated with a retaining washer 527 carried by the upper end of the stem and which bears upon the upper end of the threaded body 511 having threaded portion 516 adjacent said bearing and the central bore 512 extending therethrough and in which the stem 526 is rotatably mounted. The bore 512 is enlarged at its lower end as at 525 to receive the anti-friction balls 533 which are retained in said recess by the lateral enlargement and raceway 532 formed upon or carried by the stem 526. The body 511 includes the lateral flange 513 and the depending skirt portion 514 for ball retention. The tubular leg is supported by the laterally exposed portion of the upper surface of the flange 513. If desired, a washer 517 may be interposed between the upper surface of the flange 513 and the lower end of the elongated sleeve of rubber tubing 520. The upper end thereof is engaged by the serrated face 523 of the nut 521 which has threaded connection with the threaded portion 516 of the body 511.

From the foregoing, it will be noted that in each instance, the laterally expansible means is illustrated as of sleeve like character and peripherally envelopes the body portion which supports the stem of the caster and to which it is either detachably or permanently secured. The lateral expansion is obtained by causing the nut associated with the threaded upper end of the body portion to move toward the lateral enlargement, flange or plate portion which may be rigid with the body or, if desired, may be rotatably supported thereby and which supports the lower end of a tubular leg adapted to receive the socket formation.

The present invention also contemplates, whenever desired, the formation of a lateral enlargement against which the lower end of the rubber like tube may bear so that when the nut moves toward said last mentioned lateral enlargement, the tube will be laterally expanded for frictional engagement with the surrounding member, such as the tubular leg. If desired, a plurality of tubes may be successively arranged or associated together in continuous relation or in spaced relation. Such transposition from a single to a plural superposed construction in spaced relation is illustrated in the William H. Noelting Patent No. 1,693,657, dated December 4, 1928, compare Figs. 3 and 4.

The invention claimed is:—

In a caster socket, the combination of a tubular body having a threaded upper end, a nut thereon, said body being adapted to receive a caster stem, a load supporting laterally projecting portion spaced below the threaded end, yielding means extending substantially from the nut to the lateral portion and operatively engaging bolt, and outwardly expansible by threading relative movement of the nut toward the lateral portion, and an interlocking operative connection between the nut and end of the yielding means adjacent thereto.

In witness whereof, we have hereunto affixed our signatures.

WILLIAM H. NOELTING.
WALTER M. VAN DUSEN.